United States Patent [19]

Himmler et al.

[11] Patent Number: 4,545,239

[45] Date of Patent: Oct. 8, 1985

[54] METHOD AND APPARATUS FOR CONTROLLING THE QUALITY OF TIRES

[75] Inventors: Günther Himmler, Darmstadt; Friedrich Wenz, Seeheim-Jugenheim, both of Fed. Rep. of Germany

[73] Assignee: Gerb. Hofmann GmbH & Co. KG, Pfungstadt, Fed. Rep. of Germany

[21] Appl. No.: 526,294

[22] Filed: Aug. 25, 1983

[30] Foreign Application Priority Data

Aug. 26, 1982 [DE] Fed. Rep. of Germany ....... 3231852

[51] Int. Cl.$^4$ ...................... G01M 17/02; G01L 5/16
[52] U.S. Cl. ..................... 73/146; 73/862.04
[58] Field of Search ............................ 73/146, 862.04

[56] References Cited

U.S. PATENT DOCUMENTS 3,927,561 12/1975 Schleimann ........................... 73/146
4,197,736 4/1980 Barrett ................................. 73/146

FOREIGN PATENT DOCUMENTS 2320322 11/1974 Fed. Rep. of Germany ........ 73/146

Primary Examiner—Donald O. Woodiel
Attorney, Agent, or Firm—Fleit, Jacobson, Cohn & Price

[57] ABSTRACT

A method and apparatus for controlling the quality of tires, in particular automobile tires, in which a rotating tire rolls on a rolling surface of a test drum and where one force-measuring system measures the dynamic force portions and another force-measuring system measures the static force portions of the forces exerted by the rotating tire in the same flux of forces through the rolling surface of the test drum which is supported on the same bearing element of a bearing unit.

15 Claims, 4 Drawing Figures

FIG. 2
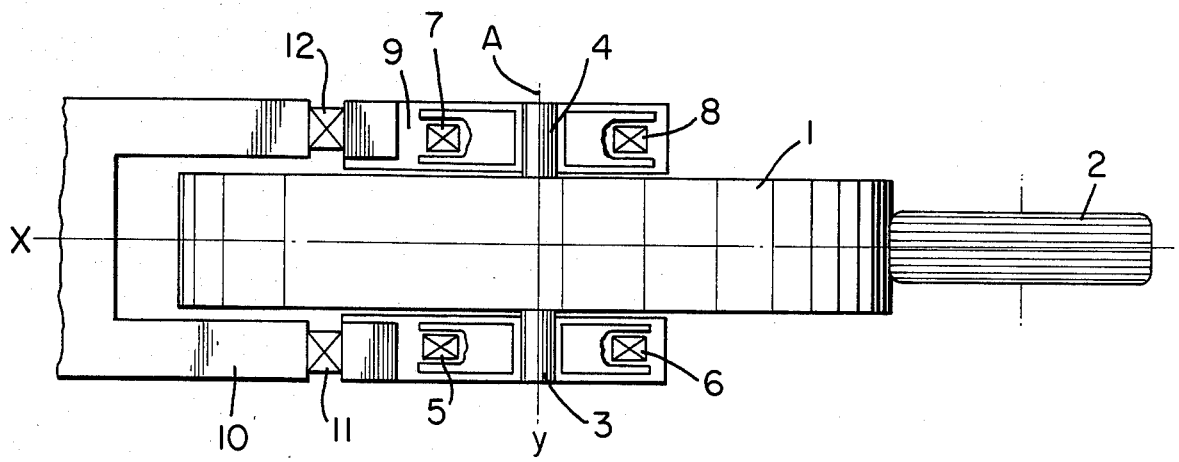
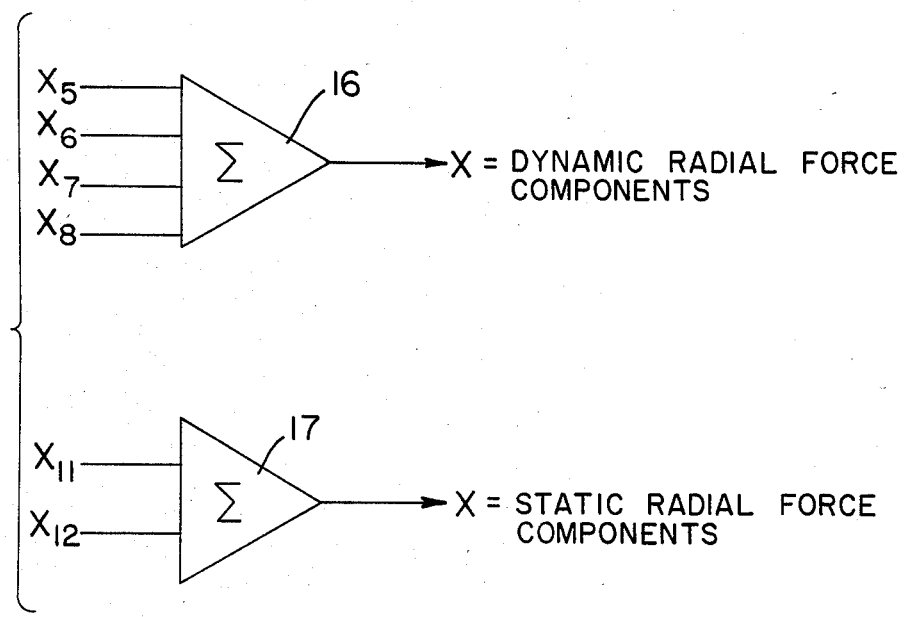
FIG. 4

METHOD AND APPARATUS FOR CONTROLLING THE QUALITY OF TIRES

BACKGROUND OF THE INVENTION

The invention generally relates to a method and apparatus for controlling the quality of tires.

DESCRIPTION OF THE PRIOR ART

U.S. Pat. No. 3,927,561 (incorporated by reference herein) refers to a method and apparatus for quality control of tires in which several transducers are provided for determination of the radial, lateral and tractive force components as well as the moments acting about the vertical tire axis and the tire contact area.

The transducers of this known equipment are used for determination both of static and dynamic force portions. The static force portions are generally at least 100 times the dynamic force portions. Therefore, the measuring system has to be of utmost sensitivity in order to ensure sufficient resolution.

At high sensitivity the natural frequency of this system is, however, very low so that only low test speeds of for example up to 7 km/h can ensure reliable measurements.

In recent times requirements have been made for testing tire uniformity at high speeds up to 200 km/h. In order to guarantee reliable measurement, the test drum, the shaft and the transducers need to have at least three times the frequency of maximum test speed which, in turn, depends on the test velocity.

German Patent Application DE-AS No. 2 320 322 relates to a tire test stand in which two separate measuring systems mounted in parallel are used, with the first measuring system intended for determination of the initial stress and the second measuring system for determination of the deviation of radial force from a given nominal value.

This test stand was designated to meet the requirements for high resolution by compensation and separate measurement of the static force portions.

The test results obtained with this stand are, however, adversely affected because the two measuring systems are mounted with the forces shunted, hence are subjected to different forces depending on the selected stiffness, with the stiffness of the tire being included in the measured results as a falsifying variable.

SUMMARY OF THE INVENTION

Therefore, it is a primary object of the present invention to provide a method and apparatus for controlling the quality of tires as specified above in order to guarantee high resolution for the dynamic measurement and to guarantee high natural frequency of the measuring system determining the dynamic force portions as well as long-term measurement of the static force portions.

Hence the invention relates to a method and apparatus in which the rolling surface of a test drum is supported on a bearing unit through a first measuring system for determination of the dynamic force portions and through a second force measuring system for determination of the static force portions, with the two measuring systems mounted in series with, or in the same flux of forces through, the support of the rolling surface relative to the bearing unit. As used herein the term "flux of forces" means that both the static and the dynamic force portions are transmitted through the same bearing elements, i.e., that the measuring system for the static force portions and the measuring system for the dynamic force portions are arranged in series.

High measuring sensitivity at high natural frequency is obtained by using two measuring systems mounted in series, or in the same flux of force, with the first measuring system employing piezo-electric load cells for determination of the dynamic force portions acting in radial, lateral, or tangential direction.

Measuring of the static portions by the second measuring system, which is connected in series with the first one, is accomplished with strain gages (strain-gage force-measuring elements). The second measuring system is so dimensioned to ensure sufficient measuring accuracy for the static measurement at high natural frequency.

The first measuring system employs preferably two parallel transducers to detect the starting and braking torques. Alternatively the transducers are mounted at right angles to each other (90 deg. apart).

An advantage is that cross-talk between the two measuring systems is very low.

BRIEF DESCRIPTION OF THE DRAWINGS

The preferred embodiment is illustrated in the accompanying drawings, with only the static force portions of the radial force being shown for better understanding.

FIG. 2 is a top view of a test stand as per FIG. 1, partly in section.

FIG. 4 is a part of the schematic configuration of electronic analyzing circuits for the radial force component.

DESCRIPTION OF THE PREFERRED EMBODIMENT

Figure 1:
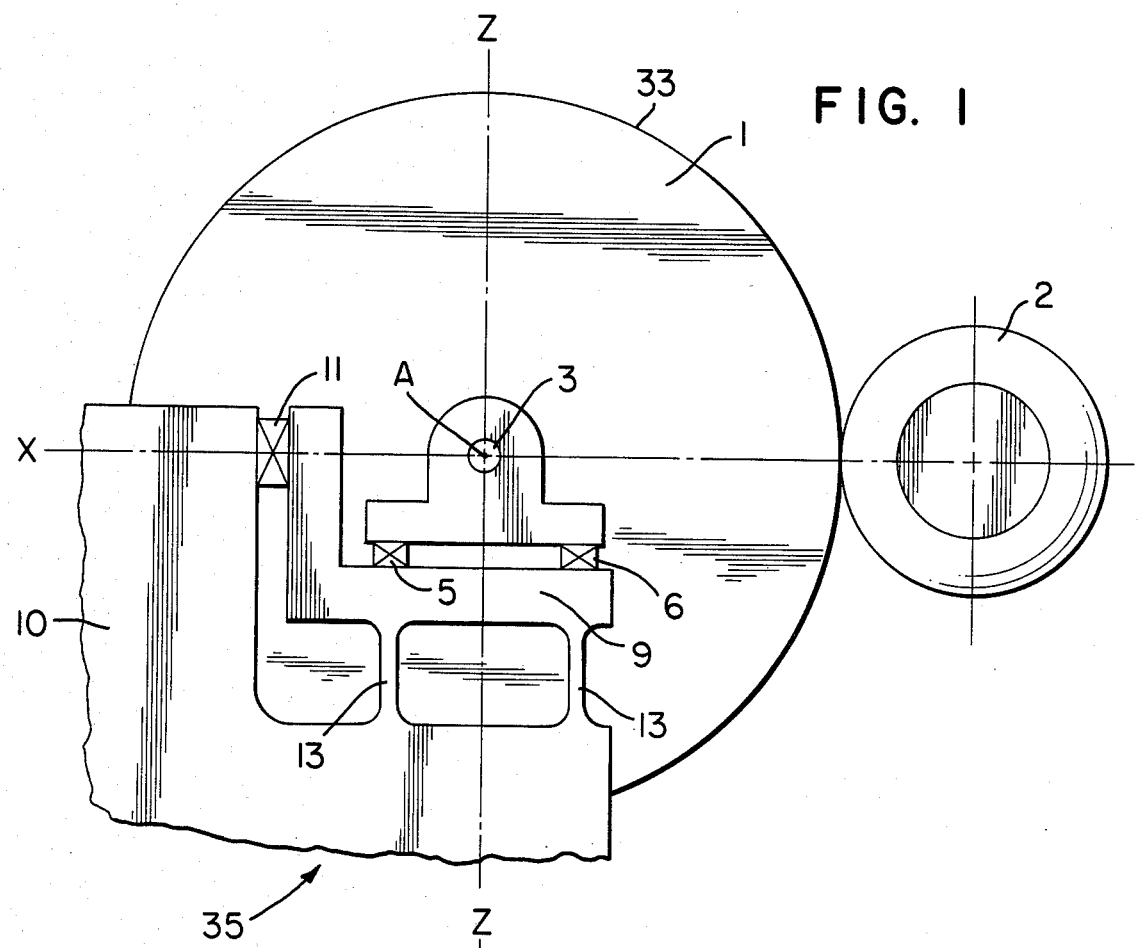
FIG. 1 is a schematic side view of a first preferred embodiment.
Figure 3:
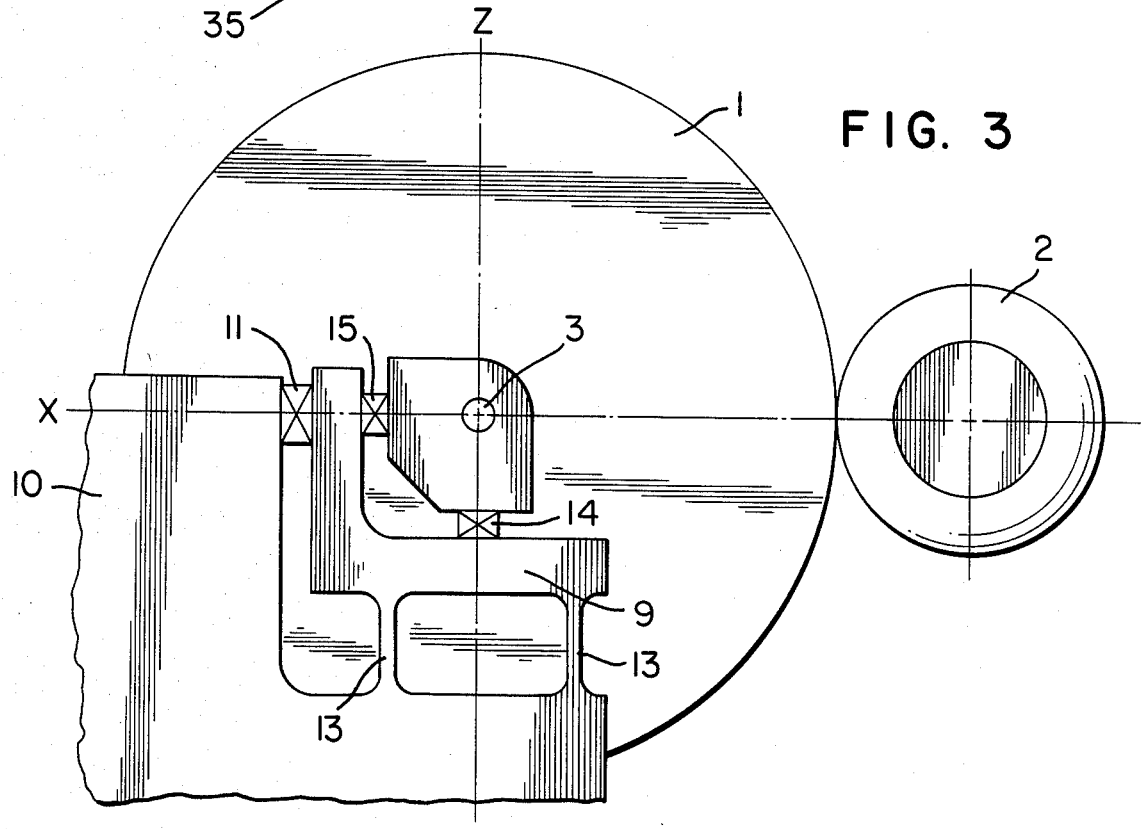
FIG. 3 is a schematic side view of a second preferred embodiment.

The apparatus illustrated in the FIGS. 1 and 3 shows the rolling surface 33 of a test drum 1 which is rotatably supported in two bearings 3 and 4. The tire 2 is pressed against the rolling surface of the test drum 1 in a manner similar to that of U.S. Pat. No. 3,927,561 at a preset contact pressure P. Rotary drive of the testing apparatus, generally designated 35, is taken either to the test drum 1, or to the tire 2.

The bearings 3 and 4 are supported on the bearing bridge 9 through each one of first measuring system 5, 6, 7, 8 (FIGS. 1, 2) or 14, 15, (FIG. 3). Said measuring system comprises the transducers 5 to 8 (FIGS. 1, 2) or 14, 15 (FIG. 3) using active force-measuring elements in form of piezo-electric load cells which ensure high measuring sensitivity at high natural frequency and which are intended for determination of the dynamic force portions. Alternatively the active force-measuring elements 5 to 8, or 14, 15 are multi-component force-measuring elements to measure for example radial, lateral, and tractive forces.

A second measuring system 11, 12 is interposed between the bearing bridge 9 and the bearing unit 10. This measuring system comprises the transducers 11 and 12 using strain gages (strain-gage force-measuring elements) which are so dimensioned to have a high natural frequency at sufficient measuring sensitivity for determination of the static force portions. For determination of the static portions, the measured values are added during several cycles of the test drum or tire to obtain in the end their mean value.

The second measuring system 11, 12 is guided relative to the bearing unit 10 without shearing forces by means of the parallel guide 13.

To avoid hysteresis, the second measuring system 11, 12, the bearing bridge 9, the parallel guide 13, and the bearing unit 10 are made of one piece of closing shape. This is also to achieve higher natural frequency of the measuring system.

Two parallel transducers 5, 6 or 7, 8 of the first measuring system are arranged in the plane of each bearing to detect the starting and braking torques occurring during the test.

An alternative for detection of the starting and braking torques is shown in FIG. 3, with the transducers 14 and 15 of the first measuring system being arranged at right angles relative to each other and with respect to the bearing axis A of the test drum 1.

For better understanding, FIG. 4 illustrates only part of the configuration of electronic analysing circuits for the radial force component. The radial force components are fed to a first adding circuit 16, at the output of which the value of the dynamic radial force components X of the second measuring system 11 and 12 are fed to a second adding circuit 17 at the output of which the values of the static radial force components are available.

Connection of the transducers in an electronic measuring unit, of the type disclosed in for example U.S. Pat. No. 3,490,277 (Sanders et al) or U.S. Pat. No. 3,550,442 (Carr et al) is carried out in the known manner so that selection of the measured components is achieved unless already effected by the measuring system itself. In principle all measuring elements supply both static and dynamic portions in the known manner by means of the analysing circuit of either of the two patents.

All other forces and moments of interest are determined analogously in the known manner as disclosed in U.S. Pat. No. 3,927,561.

Although the present invention has been shown and described in terms of specific preferred embodiments, it will be appreciated by those skilled in the art that changes and modifications are possible which do not depart from the inventive concepts described and taught herein. Such changes and modifications are deemed to fall within the purview of these inventive concepts.

What is claimed is:

1. A method for quality control of tires, said method comprising:
   a. rotating a tire against a rotatable drum;
   b. measuring the dynamic force components of the rotating tire by a first force measuring means;
   c. measuring the static force components of the rotating tire by a second force measuring means, said first and said second force measuring means receiving forces through common bearing elements supporting said drum;
   d. feeding said dynamic force components to a first adding circuit to provide a first output;
   e. feeding said static force components to a second adding circuit to provide a second output; and
   f. combining said first and second outputs in an analyzer means to provide a desired signal output.

2. Apparatus for controlling the quality of tires, said apparatus comprising:
   a. means for rotatably supporting a tire;
   b. drum means supported for rotation and adapted to be in pressure engagement with the periphery of a tire;
   c. means to urge said tire and said drum means into contact engagement at a predetermined contact pressure;
   d. drive means for driving one of said tire and said drum means at a predetermined speed;
   e. support means for rotatably supporting said drum means, said support means including a bearing unit and a bearing bridge carried by said bearing unit, said bearing bridge supporting said drum means;
   f. first force measuring means carried on said bearing bridge for measuring dynamic force components of said rotating tire;
   g. second force measuring means supported between said bearing bridge and said bearing unit for measuring static force components of said rotating tire; and
   h. analyzing circuit means connected to said first and said second force measuring means for determining the forces and moments of said rotating tire.

3. Apparatus according to claim 2 in which the force-measuring elements measuring the dynamic force portions are active force-measuring elements and the force-measuring elements measuring the static force portions are passive force-measuring elements.

4. Apparatus according to claim 2 in which the second force measuring means is guided in the direction of the radial force component X relative to the bearing unit by means of a parallel guide extending between and interconnecting the bearing unit and the bearing bridge.

5. Apparatus according to claim 2 in which the second force-measuring means are arranged in the direction of introduction of the forces from the tire to be tested onto the rolling surface.

6. Apparatus according to claim 2 in which the test drum is supported through the first force-measuring means carried on the bearing bridge which is guided on the bearing unit by means of a parallel guide means extending between and interconnecting the bearing unit and the bearing bridge and in which the bearing bridge is supported on the bearing unit in the direction of its deflection through the second force-measuring means.

7. Apparatus according to claim 2 in which two pairs of parallel force-measuring elements are provided for the first force measuring means.

8. Apparatus according to claim 2 in which two transducers arranged 90 degrees apart are provided for the first force measuring means.

9. Apparatus according to claim 2 in which the bearing bridge is an L-shaped member having one leg supported by parallel guides that extend upwardly from said bearing unit, said one leg supporting said first force measuring means, said L-shaped member having a second leg substantially perpendicular to said first leg and separated from said bearing unit by said second force measuring means.

10. Apparatus according to claim 9 in which said bearing unit, said bearing bridge, and said parallel guides are of a unitary structure.

11. Apparatus according to claim 2 in which the bearing bridge is an L-shaped member having one leg supported by parallel guides that extend upwardly from said bearing unit, each of said legs supporting said first force measuring means, said L-shaped member having a second leg substantially perpendicular to said first leg and separated from said bearing unit by said second force measuring means.

12. Apparatus according to claim 11 in which said bearing unit, said bearing bridge, and said parallel guides are of a unitary structure.

13. Apparatus according to claim 2 in which said first and said second force measuring means each provide output signals and said output signals are connected in series.

14. Apparatus according to claim 2 in which said first force measuring means are piezo-electric load cells.

15. Apparatus according to claim 2 in which said second force measuring means are resistance strain gauges.

* * * * *